March 17, 1931.  J. V. ROBINSON  1,797,172
AUTOMATIC TRAIN PIPE CONNECTER
Original Filed March 11, 1920   3 Sheets-Sheet 3
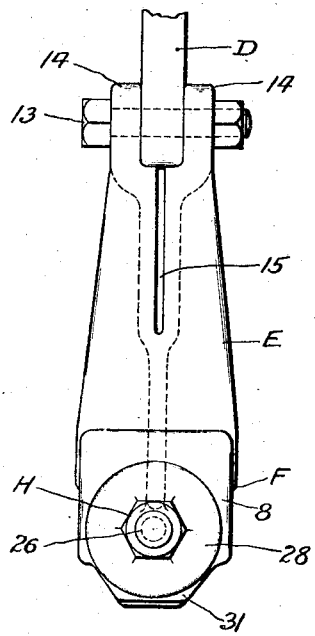
Fig. 3.
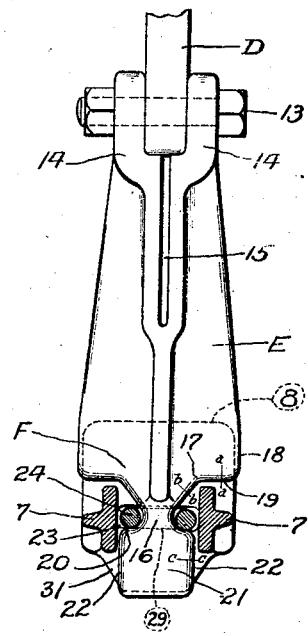
Fig. 4.
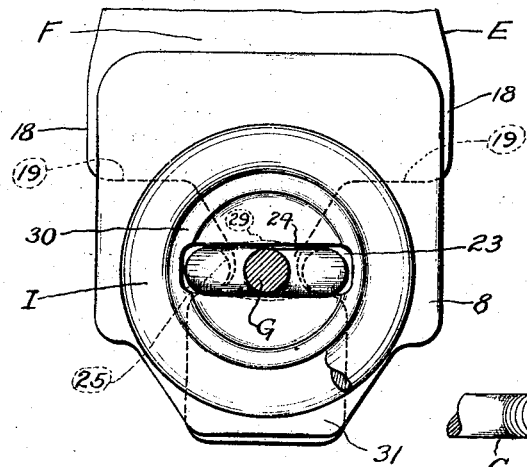
Fig. 5.
Fig. 6.
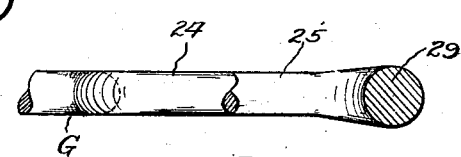
Fig. 7.
Inventor
Joseph V. Robinson,
By his Attorneys
Foster, Freeman, Watson & Coit.

Patented Mar. 17, 1931

1,797,172

UNITED STATES PATENT OFFICE

JOSEPH V. ROBINSON, OF NEW YORK, N. Y.

AUTOMATIC TRAIN-PIPE CONNECTER

Application filed March 11, 1920, Serial No. 364,920. Renewed April 27, 1929.

My invention relates to automatic train pipe connecters for steam and electrically operated cars and has among its objects to provide a simple and efficient support for the coupling heads of such connecters which will be simple and economical of manufacture, powerful in construction, and highly efficient in operation offering the minimum resistance to universal movement of the coupling head. An important feature of flexible supports for automatic train pipe couplings is that they shall offer the least resistance to universal movement of the coupling head, thus minimizing the forces which tend to separate coupled heads in service. The attainment of this end has been sought by various means with varying degrees of success. Where good flexibility resulted from such efforts it has invariably been obtained at the expense of simplicity and economical manufacture. In my improvement I not only attain the maximum of flexibility with the minimum of resistance, but I obtain it from a powerful construction of extreme simplicity and low manufacturing costs.

My improvement consists of the combinations, arrangements, and constructions hereafter described, pointed out in the appended claims, and illustrated in the accompanying drawings, in which Figure 1 is a side elevation of my improved support.

Figure 3 is a rear elevation of my improvement.

Figure 4 is a sectional elevation taken on the line 4—4 of Figure 1.

Figure 5 is an enlarged detail of my improved support taken on the line 5—5 of Figure 1.

Figure 6 is an enlarged sectional detail taken on the lines $a$—$a$, $b$—$b$ and $c$—$c$ of Figure 4, and Figure 7 is a detail sectional view through the forward wall 29 of the eye bolt G of my improvement.

Figure 1:
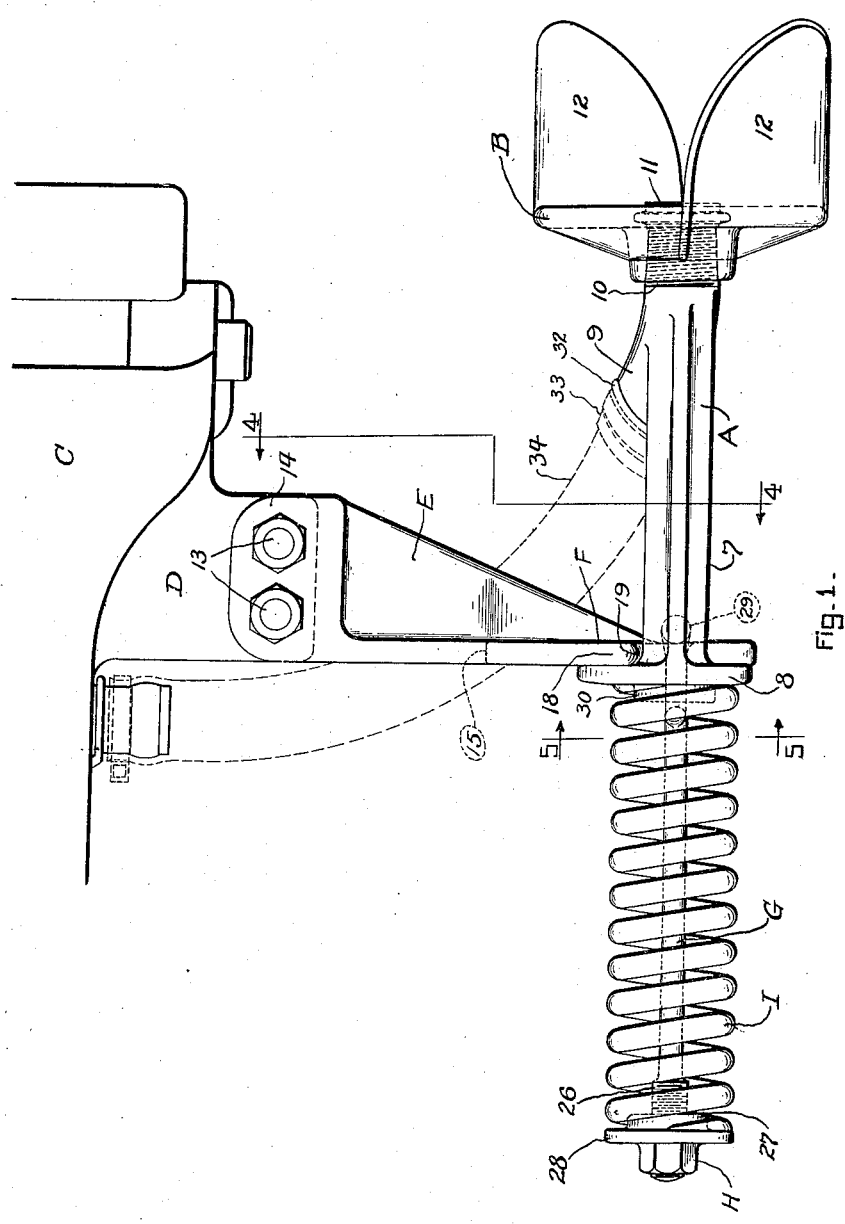

Referring now to the drawings: My improved support comprises a hollow body or yoke A, formed of a pair of spaced straps or members 7 which lie in a substantially horizontal plane and which terminate at their rear end in a vertically extending flange or projection 8 integrally formed with the members 7, which members at their forward end terminate in, and are integrally formed with, a latterly diverging fluid conduit 9 which is threaded as at 10 to receive any suitable form of coupling head B. The coupling head is perforated as shown, and carries at the forward end of such perforation a suitable gasket 11 having communication with the conduit 9 and adapted to abut with a corresponding gasket in the head of an opposing connecter. Suitable means 12 are provided on the head B for effecting accurate alignment of the gasket 11 of opposing heads when making coupling thereof under conditions of vertical or lateral disalignment.

Figure 2:
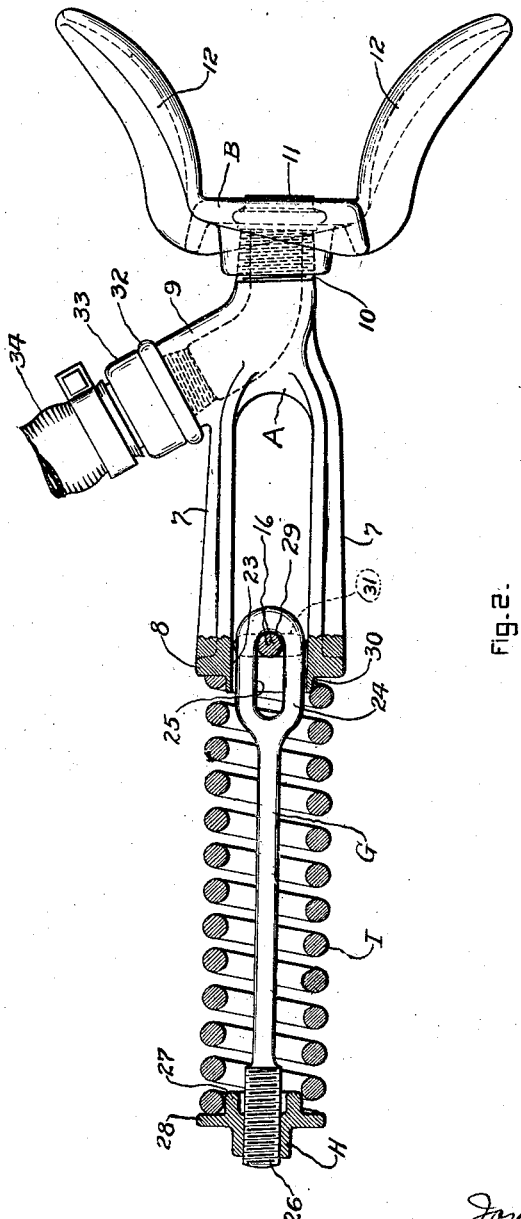
Figure 2 is a longitudinal sectional plan view thereof.

On the under side of the car coupler C I provide a suitable lug D connected in any desired manner with the coupler C or formed integrally therewith. Spanning this lug and suitably connected thereto as by bolts 13, I provide a bracket or base E which terminates at its upper end in a pair of spaced ears 14 adapted to embrace the lug D as aforesaid, the bracket or base being split as at 15 to facilitate efficient clamping of the ears to the lug D through the medium of the bolts 13. The lower end of the bracket E terminates in what may be described as a T shaped vertically extending portion F, the central part 16 of which projects into the hollow of the body A between the aforesaid straps or members 7 and in front of the flange 8. At an intermediate point the part 16 of the bracket is circular in cross section as shown in Figure 2, thus forming a circular neck. Above this neck the side walls of the part 16 diverge upwardly and join at 17 with what may be described as overhanging shoulders 18 of the bracket E, the lower face 19 of which shoulders preferably lie in the horizontal plane. Below said neck the side walls of the part 16 diverge downwardly and join with the corners or shoulders 20 of a flat abutment or lip 21 having substantially straight vertical edges 22, which abutment lies in front of the flange 8 and is formed integrally with the portion 16 and constitutes the lower extremity of the bracket or base E. The abutment 21 is considerably wider transversely than the thickness of the portion 16, the shoulders 20 and the edges 22 of the abutment being rounded in cross section to facilitate the operation of the parts of my improved support, as shown particularly in Figures 4 and 6.

Embracing the portion 16, and extending rearwardly thereof on the longitudinal axis of my improved support, through an elongated opening 23 in flange 8, I provide an eye bolt or pivot device G having at its forward end an elongated head 24 provided with an elongated opening 25 as shown especially in Figure 2. At its rear end the eye bolt G is provided with a threaded portion 26 adapted to threadingly receive an abutment or nut H which is adjustable along the portion 26 and is provided with an annular seat 27 and an annular flange 28 adapted to receive a spring. The forward wall 29 of the eye bolt head 24 is round in cross section as shown in Figure 7, and to withstand the wear of service is preferably of greater thickness at this point than at other portions thereof. Upon the rear face of the flange 8 I provide an annular seat 30, and upon this seat I mount the forward end of a helical buffer spring I, which surrounds the eye bolt G and has its rear end seated upon the seat 27 and against the flange 28 of the nut H. The purpose of this spring is to yieldingly support the coupling head B and maintain it at the limit of its forward movement with the flange 8 normally pressing against the rear side of the portion F, and the abutment or lip 21, of the bracket or base E. The compression of the spring I, necessary to accomplish this, is secured by adjusting the nut H along the threaded portion 26 of the eye bolt G, by which operation the compression of the spring may be varied at will.

To attain uniformity of forces required to move the coupling head B in the vertical plane I construct that portion of the flange 8 which lies above the longitudinal center line of my improvement, of greater length than that portion thereof which lies below such center line. In this manner the force required to move the coupling head downwardly from the normal uncoupled position is equalized with that required to move the head upwardly from such position, thus eliminating jamming and coupling failures of the head due to unequal flexing of opposing heads. Excessive rotation of the coupling head B about its longitudinal axis is effectively prevented through contact of the straps or members 7 with the edges 22 of the abutment or lip 21, and with the edges 19 of the overhanging portions or shoulders 18 of the bracket or base E, which arrangement of parts produces an efficient guide for the body member A with respect to the base E, the eye bolt G cooperating with the shoulders 20 of the abutment 21 to prevent dislodgement of the body A from its operative relation to the bracket E. It will be observed that the flange 8 of the body member A is wider at its top than at the bottom thereof, the top of the flange approximating in width the width of the bracket at the point where the flange contacts therewith, while the lower part 31 of the flange narrows to substantially the width of the abutment or lip 21. The flange thus is substantially the same shape as the lower part of the bracket. Through the conduit 9 of the body member A I suitably connect, as by a union 32 and 33, any desired form of train pipe hose 34 for conveying the fluid from the train pipe of the car to the gasket 11 in the coupling head carried by my improved support.

While I preferably construct my improved support so that the portion 16 thereof lies on the longitudinal center line of the hollow body A, it may, if desired, be otherwise constructed, and of other conformation than that described and illustrated. The portion 16 is assembled and positioned with respect to the flange 8 and the eye bolt G by passing the eye bolt into the hollow of the body A through the opening 23 in the flange 8 whereupon the bracket E is turned to an angle of 90 degrees from that shown in Figures 1 and 4, and is then let down into the hollow of the body A, the abutment 21 passing through the elongated opening 25 in the head 24 of the eye bolt G. The bracket is then turned to the normal position and the spring I and the nut H applied. This construction and arrangement of parts produces a simple and highly efficient support having a universal joint, or flexing means, of the character described for permitting universal movement of the coupling head B the mating surfaces of the members of which universal joint flare in opposite directions and in different planes as shown especially in Figures 2 and 7.

What I claim as new is:

1. In an automatic train pipe coupling, the combination of a hollow body connected at one end with a coupling head and having at its other end a vertically disposed perforated flange, a bracket provided at its lower end with a vertically disposed portion which lies within said hollow body and which extends downwardly and is contracted inwardly to form a cylindrical seat and thence diverges outwardly to form an abutment for said flange and for the inner face of the walls of said hollow body whereby excessive forward movement of said body and undue rotation thereof about its longitudinal axis are prevented, a pivot device extending through the perforation in said flange and having an inner wall with diverging sides pivotally mounted upon said cylindrical seat, a spring surrounding said pivot device and bearing upon the rear side of said flange, and an abutment for said spring adjustably mounted upon the rear end of said pivot device.

2. In an automatic train pipe connecter, a coupling head, a yoke secured thereto and extending rearwardly thereof, said yoke having two spaced members having vertically arranged straight inner surfaces, a bracket extending downwardly between said members, said bracket having a portion adjacent its lower end provided with vertically arranged straight edges adapted to cooperate with the straight inner surfaces of said members to prevent undue rotation of said yoke about its longitudinal axis, said yoke having on its rear end a projection adapted to engage the rear side of the bracket, said bracket having a vertically arranged portion integral therewith adapted to form a bearing for a tie rod, a tie rod engaging said portion of the bracket and extending rearwardly thereof, and a spring surrounding said rod and engaging said projection.

3. In an automatic train pipe connecter, a coupling head, a yoke secured thereto and extending rearwardly thereof, said yoke having two spaced members having vertically arranged straight inner surfaces, a bracket extending downwardly between said members, said bracket having a portion adjacent its lower end provided with vertically arranged substantially straight edges adapted to cooperate with the straight inner surfaces of said members to prevent undue rotation of said yoke about its longitudinal axis, said yoke having on its rear end a projection adapted to engage the rear side of said bracket, said bracket having a contracted portion above said straight edges forming a neck thereon, a tie rod pivotally engaging said neck and extending rearwardly thereof and a spring surrounding said rod and engaging said projection.

4. In an automatic train pipe connecter, a coupling head, a yoke secured thereto and extending rearwardly thereof, said yoke having two spaced members having vertically arranged straight inner surfaces, a bracket extending downwardly between said members, said bracket having a portion adjacent its lower end provided with vertically arranged straight edges adapted to cooperate with the straight inner surfaces of said members to prevent undue rotation of said yoke about its longitudinal axis, said yoke having on its rear end a projection adapted to engage the rear side of the bracket, said bracket above said straight sides being contracted to form a substantially circular neck, a tie rod surrounding said neck and extending rearwardly of the bracket through said projection, and a spring surrounding said rod and engaging said projection.

5. In an automatic train pipe connecter, a coupling head, a yoke secured thereto and extending rearwardly thereof, said yoke having two spaced members having vertically arranged straight inner surfaces, a bracket extending downwardly between said members, said bracket having a portion adjacent its lower end provided with vertically arranged substantially straight edges adapted to cooperate with the straight inner surfaces of said members to prevent undue rotation of said yoke about its longitudinal axis, said yoke having on its rear end a projection adapted to engage the rear side of said bracket, said bracket also having an integral portion arranged between said spaced members and provided with a seat on its front face, a tie rod pivotally engaging said seat and extending rearwardly thereof and a spring carried by said tie rod and engaging said projection.

6. In an automatic train pipe connecter, a coupling head, a yoke secured thereto and extending rearwardly thereof, said yoke having two spaced members having vertically arranged inner surfaces, a bracket extending downwardly between said members, said bracket having a portion adjacent its lower end provided with vertically arranged edges adapted to cooperate with the inner surfaces of said members to prevent undue rotation of said yoke about its longitudinal axis, said yoke having on its rear end a projection adapted to engage the rear side of said bracket, said bracket also having an integral portion arranged between said spaced members and provided with a curved seat, a tie rod pivotally engaging said seat and extending rearwardly thereof and a spring carried by said tie rod and engaging said projection.

7. In an automatic train pipe connecter, a coupling head, a yoke secured thereto and extending rearwardly thereof, said yoke having two spaced members having vertically arranged inner surfaces, a bracket extending downwardly between said members, said bracket having a portion at its lower end provided with vertically arranged edges adapted to cooperate with said inner surfaces of said spaced members to prevent undue rotation of said yoke about its longitudinal axis, said bracket above said yoke being provided with portions which overhang the upper edges of said spaced members, said yoke also having on its rear end a portion adapted to engage the rear side of said bracket, the portion of said bracket between said spaced members being provided with a contracted neck above said vertically arranged edges thereon, a tie rod pivotally engaging said neck and extending rearwardly of the bracket and a spring carried by said tie rod and engaging said portion.

In testimony whereof I hereby affix my signature.

JOSEPH V. ROBINSON.